April 6, 1965 R. B. ASHLEY 3,177,448

STABILIZED MULTIVIBRATOR

Filed Sept. 14, 1961

INVENTOR:
ROBERT B. ASHLEY,
BY Joseph Levinson
HIS ATTORNEY.

United States Patent Office 3,177,448

Patented Apr. 6, 1965

3,177,448

STABILIZED MULTIVIBRATOR

Robert B. Ashley, North Syracuse, N.Y., assignor to General Electric Company, a corporation of New York Filed Sept. 14, 1961, Ser. No. 138,170
3 Claims. (Cl. 331—144)

This invention relates to multivibrator circuits and more particularly to an improved means for stabilizing the operation of multivibrator circuits.

Multivibrator circuits are frequently used as oscillators in television receivers for the generation of horizontal and vertical sweep wave forms. As is well known, these sweep wave forms with cooperating deflection means produce a picture raster. Any change which occurs in the frequency of operation of the multivibrator oscillators producing these wave forms results in an undesirable distortion of the raster and of the reproduced television image. Such a change in frequency may be caused, for example, by electrical "noise" which appears in the multivibrator circuit and which forces the multivibrator to mistrigger. It is of course necessary that these changes in frequency be minimized.

Various means are known in the art for reducing these undesirable changes in frequency. In a multivibrator utilizing two electron discharge amplifying devices, a known method makes use of a parallel resonant ringing circuit connected in the anode circuit of a first of the two amplifying devices. The first device is generally the device which conducts plate current for the major portion of the multivibrator cycle. The values of inductance and capacitance utilized in the ringing circuit are chosen so that the resonant frequency of the ringing circuit is approximately the frequency of the multivibrator. A resistance-capacitance (RC) relaxation timing network couples the anode of the first device to the control electrode of the second device. The RC relaxation network, in addition to providing the usual multivibrator discharge curve for timing the plate current cut-off of the second device, also couples a sine wave generated in the ringing circuit to the control electrode of the second device. The sine wave is phased so that the resulting RC discharge voltage curve has superimposed upon it the positive half cycle of the sine wave variation during the first half of the discharge curve and the negative half cycle of the sine wave during the latter half of the discharge curve. This phasing of the negative half cycle during the latter portion of the discharged curve results in maintaining the grid-cathode voltage of the second device in the cut-off region at a voltage more remote from cut-off than ordinarily could be achieved from the RC discharge alone and at a time when the multivibrator is most susceptible to mistriggering by noise.

A disadvantage arising from the connection of this stabilizing ringing circuit in the multivibrator circuit in the aforementioned manner is the susceptibility of the ringing circuit to the long term instability of the parameters of the amplifying device. More specifically, the ringing frequency is dependent on any resistance connected in series with the ringing circuit. One such resistance connected in series with the ringing circuit is the plate resistance of the amplifying device. As the amplifying device ages, the plate resistance generally varies causing a resulting change in the ringing frequency.

A significant change in the ringing frequency will ultimately react adversely upon the stability of the multivibrator by altering the phase of the sine wave occuring during the latter portion of the RC discharge.

It is an object of this invention to provide an improved means for stabilizing the frequency of a multivibrator.

It is also an object of this invention to provide a multivibrator having a stabilizing ringing circuit whose frequency is substantially independent of the parameters of the amplifying device used in the multivibrator.

In accordance with this invention, a multivibrator is provided having two amplifying devices. A ringing circuit for stabilizing the multivibrator frequency is connected to an input electrode of one of the devices in a manner so as to be damped only by the current flowing in the amplifying device to which it is connected.

A specific embodiment of this invention utilizes a cathode-coupled free running multivibrator having two electron discharge devices. A parallel resonant ringing circuit comprising an inductance and capacitance is connected in series with an electrode in the control electrode circuit of the device whose plate current is cut-off for the major portion of the multivibrator cycle.

Further objects, features and attending advantages of this invention will be apparent with reference to the following specifications and drawings in which.

Figure 1:
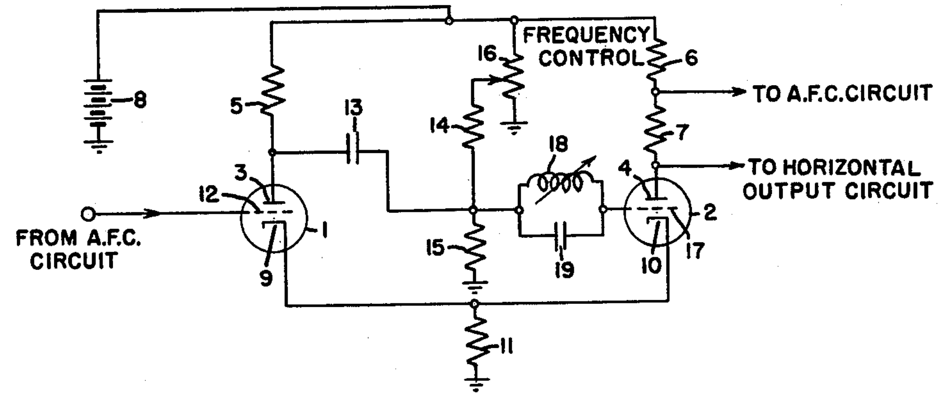
FIGURE 1 is a circuit diagram of the multivibrator of the present invention.

Referring now to FIGURE 1, a cathode-coupled free running multivibrator is shown. The operation of cathode coupled free running multivibrators is well known in the art, but in order to illustrate the application of the present invention to this circuit, the circuit of FIGURE 1 will be briefly described and its operation explained.

The multivibrator of FIGURE 1 is shown to include a pair of triodes 1 and 2 having a pair of anodes 3 and 4 as output electrodes to which an operating potential is applied through load resistors 5, 6 and 7, respectively, from a power supply 8 having its negative terminal connected to ground. A pair of input electrodes, cathodes 9 and 10, are connected together and are returned to ground through a common cathode coupling resistor 11.

An RC relaxation timing circuit comprising a capacitor 13 and a parallel combination of resistors 14, 15 and a potentiometer 16 couples any voltage changes occurring at the output electrode, anode 3, of triode 1 to an input electrode, control grid 17 of triode 2, via a ringing circuit which is comprised of a variable inductance 18 and a capacitor 19. The frequency control potentiometer 16 is provided for varying the time constant of the timing circuit and therefore the frequency of the multivibrator. The desired output wave form would generally be taken from the anode 4 of the triode 2 and coupled thereafter, when used in a television receiver, to a horizontal output circuit.

The circuit as shown, in FIGURE 1 is suitable for use with an automatic frequency control system utilized in the horizontal sweep system of television receivers. Automatic frequency control circuits are well known in the art. In such an application, a D.C. control voltage from the automatic frequency control circuit, not shown, would be applied to a control electrode 12. The reference signal necessary in the automatic frequency control circuit for comparison of the frequency output of the multivibrator with horizontal synchronizing pulses in the receiver may be derived from the junction of resistors 6 and 7.

Figures 2, 3:
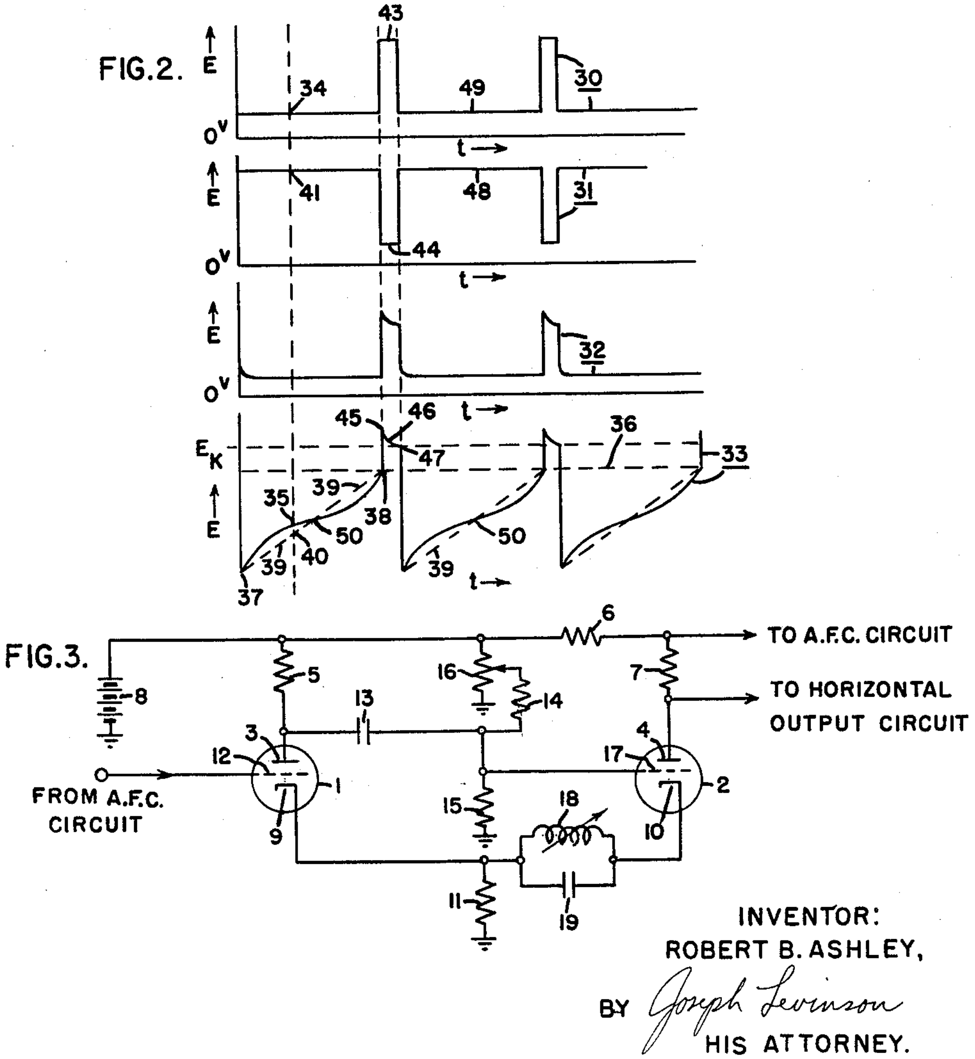
FIGURE 2 is a diagram of a group of voltage versus time waveform present at various points in the circuit of FIGURE 1 which illustrate the operation of FIGURE 1.
FIGURE 3 is a circuit diagram of another embodiment of this invention.

The operation of the free running multivibrator of FIGURE 1 will now be briefly explained. Referring to FIGURE 2, the voltage versus time wave forms existing in the circuit of FIGURE 1 are illustrated by a curve 30, the wave form of voltage between anode 3 and ground potential, a curve 31 the wave form of voltage between anode 4 and ground potential, a curve 32 the wave form of voltage between the cathodes 9 and 10 and ground potential, and a solid line curve 33 the wave form of voltage existing between control electrode 17 and ground potential.

Assuming that the multivibrator is operating and that the voltage level at the anode 3 is at the level indicated by point 34 on curve 30, then the voltage between the control grid 17 and ground potential at the corresponding time, indicated by point 35 on curve 33, is below the anode current cut-off voltage of the triode 2. This cut-off is indicated by the dashed line 36 on curve 33.

It can be seen in FIGURE 2 that the portion of curve 33 between the points 37 and 38 is a solid line and that an additional dashed line 39 is shown joining these points. The dashed line 39 represents the more linear portion of the exponential discharge path of the RC timing circuit in the multivibrator when a ringing circuit is not utilized in the multivibrator. The sinuous solid line portion of the curve 33 between points 37 and 38, to be discussed hereinafter, represents the discharge path of the RC timing circuit of the multivibrator when the ringing circuit employed in this invention is utilized.

For purposes of explaining the basic operation of the multivibrator, it may be assumed that the junction of resistors 14 and 15 is connected directly to the control electrode 17 without an intermediate ringing circuit. Under these circumstances and at a time corresponding to point 34 of curve 30, the capacitor 13 will have a voltage established across it which provides a negative voltage at control grid 17 as indicated by point 40 on discharge curve 39. The capacitor 13 discharges through the parallel combination of the anode resistance of triode 1 and resistor 5 and the parallel combination of resistors 14, 15 and 16. The discharge is represented by the dashed curve 39. Since all points on dashed curve 39 are below the plate current cut-off value 36, no plate current flows in triode 2 at this time, and the anode 4 is at its most positive voltage level as indicated by point 41 on curve 31. When the capacitor 13 discharges to the point 38 on the control electrode discharge curve 39, anode current begins to flow in triode 2. This flow of anode current increases the voltage drop across the resistor 11, and since control electrode 12 is held at the automatic frequency control D.C. control potential, the bias on triode 1 increases. This causes anode current in triode 1 to diminish resulting in a positive going potential at anode 3. This positive voltage at anode 3 is coupled via capacitor 13 to the control electrode 17 of triode 2 driving the control electrode 17 further positive and resulting in a corresponding decrease in triode 1 anode current. The circuit continues this cumulative switching action in the described manner until triode 1 is driven into plate current cut-off and triode 2 is conducting its maximum current. The resulting voltage levels are indicated by the portions 43 and 44 of the voltage wave forms 30 and 31, respectively.

The triode 2 conducts during this period regardless of the increased cathode voltage because of the corresponding increase in voltage at the control electrode 17 caused by the coupled rise in the voltage from anode 3 to the control 17. This coupled voltage to control electrode 17 discharges the negative voltage on capacitor 13 and the control electrode 17 goes positive to point 45 on curve 33. This voltage above cathode voltage at control electrode 17, designated $E_k$ on curve 33, enables triode 2 to conduct even though the cathode voltage is increased. The time during which triode 2 remains conducting and triode 1 is cut-off is determined by a charge path illustrated by the portion 46 of the curve 33. The charge path illustrated by the portion 46 of curve 33 actually includes two time constants. A first is determined by the flow of current in control electrode 17. When the control electrode current ceases to flow and charge the capacitor 13, the capacitor 13 continues to charge along portion 46 of curve 33 through the parallel combination of resistors 14, 15 and 16 and the positive voltage on control electrode 17 decreases the amount of triode 2 plate current flowing through resistor 11 is no longer sufficient to maintain triode 1 in cut-off. At this point, indicated by point 47 on curve 33, a reverse transition occurs driving triode 2 into cut-off and triode 1 into full conduction. These levels are indicated by points 48 and 49 on curves 31 and 30, respectively. The multivibrator has thus completed a full cycle.

Referring now to the discharge curve of the RC circuit indicated by the dashed curve 39 of curve 33, it will now be shown why the multivibrator is more susceptible to noise during the latter half of the discharge curve than during the first half of the curve. If a noise pulse should be induced at the control electrode 17 when the control electrode voltage is at a point on the discharge curve 39 below point 50, it is less likely that this noise voltage will mistrigger the multivibrator than if the same amplitude noise should be induced when the control electrode voltage is at a point above point 50. The reason, of course, is that since the bias on triode 2 is greater at points on the curve below point 50, the multivibrator is less sensitive to triggering.

As was hereinbefore described, prior art multivibrators have utilized a ringing circuit in the plate circuit of the triode which is normally conductive during the multivibrator cycle. A sine wave derived from the ringing circuit is coupled to the control electrode of the triode normally cut-off in a manner so that the sine wave alternation is approaching its average value from its more negative alternation when the control electrode of the triode is about to reach the cut-off voltage. The result is to maintain the control grid voltage in a more negative region for a longer period of time during that period when the multivibrator would ordinarily be more sensitive to noise. The fact that the positive portion of the sine wave is also superimposed upon the normal RC discharge curve has little effect on the multivibrator since the superimposition occurs when the discharge curve is in its more negative region. Since the prior art stabilizing ringing circuits are in some manner connected in series with the plate resistance of the amplifying device for a major portion of the multivibrator cycle, the frequency of the ringing circuit, as was stated hereinbefore, is substantially dependent on the plate resistance of the amplifying device.

In accordance with this invention, a ringing circuit comprising an inductance 18 and a capacitance 19 is connected to an input electrode of the triode 2 in a manner such that any significant damping resistance other than the resistance of the inductance 18 itself, is connected to the ringing circuit only during the retrace portion of the multivibrator cycle. In FIGURE 1, the input electrode is shown to be the control electrode 17. The input electrode may also be the cathode 10, as shown in FIGURE 3 and discussed hereinafter.

Referring now to FIGURE 1 and the accompanying wave forms of FIGURE 2 which have hereinbefore been described, the ringing circuit, comprising the inductor 18 and the capacitor 19, connected between the junction of the resistors 14 and 15 and control electrode 17 generates a sine wave at the control electrode 17 as the RC timing circuit is discharging along the curve 39 of FIGURE 2. The sinuous solid line curve between points 37 and 38 is the composite curve representing the simultaneous discharge of the RC circuit and ringing of the LC ringing circuit. The ringing arises in the following manner. When the triode 2 is conducting, current flows in the control electrode 17 and the control electrode end of the ringing circuit will have a negative potential with respect to the end connected to the junction of resistors 14 and 15. The flow of control electrode current, in addition to charging capacitor 13, also creates a magnetic field in inductance 18 and stores some energy in the form of charge on capacitor 19. As the triode 2 goes into a plate current cut-off state, as was hereinbefore described, the polarity across the ringing circuit will reverse because of the inductive effect and the electrical energy stored in the capacitor 19 and the magnetic field of inductor 18 generates a sine wave oscillation which constitutes the ringing. Because of the change in polarity across the ringing circuit, the first half cycle of the sine wave will be a positive alternation. The frequency of the ringing circuit is determined by the values of inductor 18 and capacitor 19. The frequency is chosen to be approximately equal to the frequency of the multivibrator so that approximately one sine wave cycle will occur during the portion of the discharge curve between points 38 and 39 on curve 33. Thus, during the negative portion of this sine wave, the control electrode 17 will have a voltage wave form to ground indicated by the solid line curve between points 50 and 38 on curve 33. This maintains the control electrode at a potential more negative than ordinarily would be possible by the exponential discharge of the RC timing network alone. For the reasons hereinbefore described, the multivibrator will thus be less sensitive to noise and therefore stabilize the frequency of operation.

Since the ringing circuit is connected directly in series with the control electrode 17, the dissipation of any of the energy in the ringing circuit, other than by the resistance of the inductor 18, must be in the form of a flow of current from the cathode 10 to the control electrode 17 and across some dissipative impedance. Current flows across this cathode 10 to control electrode 17 path only during the time when the triode 2 is in conduction and triode 1 is cut-off; that is, during the retrace period of the horizontal sweep circuits when the multivibrator is used as a horizontal oscillator in a television receiver. As the triode 2 goes into the plate current cut-off state, an almost infinite impedance exists across the control electrode 17 cathode 10 circuit and no effective damping impedance, other than the resistance of the inductance 18, which is very small, exists to dissipate the energy in the ringing circuit. Hence, the frequency of the ringing circuit remains very stable. It can thus be seen how the described ringing circuit stabilizes the long term operation of the multivibrator by affording an extremely stable ringing frequency which is independent of circuit parameters.

Since the circuit of FIGURE 3 is similar to that of FIGURE 1, similar numerals are used to indicate a component performing the same function as in FIGURE 1. The ringing circuit comprising the inductance 18 and the capacitor 19 is shown connected between the input electrode, the cathode 10, and the common cathode resistor 11. During plate current conduction, the cathode end of the ringing circuit will be at a positive potential with respect to its common cathode resistor end. Upon plate current cut-off, a sine wave voltage exists across the ringing circuit phased so that the first alternation of the sine wave is negative going. This results in a positive alternation of the sine wave existing at the cathode 10 near the latter portion of the RC discharge which was described with relation to FIGURE 1. This positive alternation at the cathode provides the same control electrode to cathode bias voltage as a negative sine wave alternation applied to the control electrode. Since the ringing circuit is in series with the input electrode, cathode 10, damping of the ringing circuit occurs only when triode 2 conducts current.

It is obvious that circuit variations utilizing this invention may be employed by those skilled in the art. For example, the amplifying devices illustrated in FIGURES 1 and 2 may be of the semiconductor type.

While I have illustrated and described and pointed out in the annexed claims certain novel features of my invention, it will be fully understood that various omissions, substitutions and changes in the forms and details of the system illustrated may be made by those skilled in the art without departing from the spirit of the invention and scope of the claims.

What I claim as new and desire to secure by Letters Patent of the United States is:

1. A multivibrator circuit comprising a first amplifier having an anode, control grid and cathode, a second amplifier having an anode, control grid and cathode, a cathode coupling resistor connected between said cathodes and a point of reference potential, a source of potential positive with respect to said reference potential, a first anode impedance coupling said source of positive potential to the anode of said first amplifier, a second anode impedance coupling said source of positive potential to the anode of said second amplifier, a capacitor and a resistive impedance connected in series in the order named between the anode of said first amplifier and the point of reference potential, the values of said capacitor and said resistive impedance being such as to maintain said second amplifier cut off for a major portion of the cycle at the frequency of said multivibrator, a parallel resonant circuit tuned to the frequency of the multivibrator, and means connecting said resonant circuit in a series circuit between the end of said cathode resistor that is remote from the point of reference potential and the junction of said capacitor and said resistive impedance, the series circuit including the grid cathode path of said second amplifier, whereby said resonant circuit is damped only during the small portion of the multivibrator cycle when said second amplifier conducts.

2. A multivibrator circuit comprising a first amplifier having an anode, control grid and cathode, a second amplifier having an anode, control grid and cathode, a cathode coupling resistor connected between said cathodes and a point of reference potential, a source of potential positive with respect to said reference potential, a first anode impedance coupling said source of positive potential to the anode of said first amplifier, a second anode impedance coupling said source of positive potential to the anode of said second amplifier, a capacitor and a resistive impedance connected in series in the order named between the anode of said first amplifier and the point of reference potential, the values of said capacitor and said resistive impedance being such as to maintain said second amplifier cut off for a major portion of the cycle at the frequency of said multivibrator, a parallel resonant circuit tuned to the frequency of the multivibrator, means connecting said parallel resonant circuit between the junction of said capacitor and said resistive impedance and said control grid of said second amplifier, whereby said resonant circuit is damped only during the small portion of the multivibrator cycle when said second amplifier conducts.

3. A multivibrator circuit comprising a first amplifier having an anode, control grid and cathode, a second amplifier having an anode, control grid and cathode, a cathode coupling resistor connected between said cathodes and a point of reference potential, a source of potential positive with respect to said reference potential, a first anode impedance coupling said source of positive potential to the anode of said first amplifier, a second anode impedance coupling said source of positive potential to the anode of said second amplifier, a capacitor and a resistive impedance connected in series in the order named between the anode of said first amplifier and the point of reference potential, the values of said capacitor and said resistive impedance being such as to maintain said second amplifier cut off for a major portion of the cycle at the frequency of said multivibrator, a parallel resonant circuit tuned to the frequency of the multivibrator, means connecting said parallel resonant circuit between the end of said cathode resistor that is remote from the point of reference potential and said cathode of said second amplifier, whereby said resonant circuit is damped only during the small portion of the multivibrator cycle when said second amplifier conducts.

References Cited by the Examiner

UNITED STATES PATENTS

| | | | |
|---|---|---|---|
| 1,930,278 | 10/33 | Marrison | 331—146 |
| 2,070,647 | 2/37 | Braaten | 331—159 |
| 2,182,555 | 12/39 | Geiger | 331—144 |
| 2,419,772 | 4/47 | Gottier | 331—144 |
| 2,560,576 | 7/51 | Hoeppner | 331—144 |
| 2,727,145 | 12/55 | Musk | 331—144 |
| 2,782,309 | 2/57 | Aasma | 331—144 |

FOREIGN PATENTS

| | | |
|---|---|---|
| 310,632 | 10/55 | Switzerland. |

ROY LAKE, *Primary Examiner.*

JOHN KOMINSKI, *Examiner.*